United States Patent [19]

Kinni et al.

[11] Patent Number: 5,070,822
[45] Date of Patent: Dec. 10, 1991

[54] COMBUSTION UNIT

[75] Inventors: Jouni Kinni, Tampere; Seppo Ruottu, Karhula; Paavo Hyöty; Pentti Janka, both of Tampere, all of Finland

[73] Assignee: Tampella Power Oy, Tampere, Finland

[21] Appl. No.: 647,565

[22] Filed: Jan. 29, 1991

[30] Foreign Application Priority Data

Jan. 29, 1990 [FI] Finland .................. 900436

[51] Int. Cl.⁵ .............................. F22B 1/00
[52] U.S. Cl. .................. 122/4 D; 110/245; 110/216
[58] Field of Search ........... 110/245, 215, 216; 122/4 D

[56] References Cited

U.S. PATENT DOCUMENTS

| | | | |
|---|---|---|---|
| 4,330,502 | 5/1982 | Engstom | 110/245 |
| 4,640,201 | 2/1987 | Holmes et al. | 110/245 |
| 4,699,068 | 10/1987 | Engstrom | 110/245 |
| 4,746,337 | 5/1988 | Magol et al. | |
| 4,793,292 | 12/1988 | Engstrom et al. | 122/4 D |
| 4,856,460 | 8/1989 | Wied et al. | 122/4 D |
| 4,904,286 | 2/1990 | Magol et al. | |
| 4,947,803 | 8/1990 | Zenz | 122/4 D |
| 4,979,448 | 12/1990 | Sheely et al. | 110/245 |

FOREIGN PATENT DOCUMENTS 894221 9/1989 Finland .

OTHER PUBLICATIONS

"Fluidization and Fluid Particle Systems", Pemm-Corp. Publications, vol. II, Draft 6/1989, pp. 333-334.

Primary Examiner—Henry C. Yuen
Attorney, Agent, or Firm—Pollock, Vande Sande & Priddy

[57] ABSTRACT

A combustion unit for a circulation process comprises a reactor chamber and at least one particle separator placed inside the reactor chamber in the upper part thereof. At least the first outer casing of the particle separator is arranged to form a heat transfer surface. A flue gas inlet into the first outer casing is arranged to extend for the entire circumference of the casing.

15 Claims, 2 Drawing Sheets

COMBUSTION UNIT

FIELD OF THE INVENTION

The invention relates to combustion units with a reactor chamber which accommodates at least one particle separator and which is placed substantially in a vertical position. At least the vertical wall structure of the reactor chamber is arranged to form a heat transfer surface formed as a tubular structure, with the flow of a heat transfer medium being arranged inside. An exothermic combustion reaction, a so-called fluidized bed, takes place at the lower part of the reactor chamber by means of fuel and air supplies and released flue gases containing solid material flow upwards in the reactor chamber. The particle separator is a so-called cyclone separator having two vertical and essentially coaxial casings, one placed essentially inside the other. The first outer casing is provided with a flue gas inlet. Further, the first casing is provided, at the lower part thereof and preferably connected by a tapered portion, with a return duct for the solid material separated in the particle separator from the flue gases for returning the solid material to the lower part of the reactor chamber. The second, inner casing is, at the upper part thereof, connected to the subsequent process stage for carrying the flue gases essentially free of solid material through said inner casing to said process stage.

BACKGROUND OF THE INVENTION

A combustion unit of this type is known, for example, from the following reference: F. A. Zenz, Fluidization and Fluid Particle Systems, Pemm-Corp. Publications, vol. II, Draft 1989, pages 333-334. This publication deals with a so-called bubbling fluidized bed reactor. Due to its structure and flow properties. The reactor is, however, so inconvenient that there are no existing practical applications, especially where the reactor chamber should accommodate a particle separator.

Fluidized bed boilers based on circulation reaction technique, to which technique also the present invention belongs, are becoming increasingly popular in technical applications since they enable reduction of sulfuric and nitrogen oxide emissions to legitimate levels at very low costs. Especially with sulphur containing fuels the economy of the circulation reactor is excellent if the heat power of the plant is lower than 200 MW. In technical applications, the primary purpose of the combustion is the production of thermal energy which is further conducted to the heat transfer medium of the reactor chamber, which is usually water. Therefore, the walls of the reactor chamber usually contain a tubular structure formed by several parallel tubes and finlike units connecting together the tubes and forming a gas tight panel structure. Traditionally, particle separators and return system for solid material are structures placed separately from the circulation reactor chamber. The particle separator and the return system normally comprise an outer steel supporting structure and an inner ceramic layer which is to insulate the steel structure from the hot particle-gas suspension. The advantage in this kind of construction is the structural simplicity of the reactor and the particle separator. A great deal of experience has accumulated on its practicability in practical applications. The drawback in the traditional constructions is the requirement of the space since both the reactor chamber and particle separator are, in these constructions, have substantially equal main dimensions and they must be placed, for constructional reasons, far from each other. This brings about the drawback that the return system for the solid material becomes complicated in design because it must have a separate system for controlling the gas flow which system, in practice, is realized by a separate fluidized bed disposed in the return duct.

SUMMARY OF THE INVENTION

The object of this invention is to provide a combustion unit which, in applications based on circulation technique, has an advantageous design for a combustion unit, both from a constructional viewpoint and from the flow properties in cases when the particle separator is to be placed inside the reactor chamber. Therefore, it is an object of this invention to upgrade the prior art in the field. To attain these objects the combustion unit according to the present invention is primarily characterized in that at least the first, outer casing of the particle separator is arranged to form a tubular heat transfer surface, with the flow of the heat transfer medium being arranged inside the tubular structure, and that the flue gas inlet into the first, outer casing is arranged to extend for the entire circumference of the casing.

A heat transfer surface that is formed from the first outer casing is known from the U.S. Pat. No. 4,746,337, which, however, deals with a separate cyclone separator. When at least the first outside casing of the particle separator is formed into a heat transfer surface, the entire combustion unit becomes a controllable unity as to its construction and, in particular, its thermal expansion properties. In conventional technique, joining of a reactor chamber, which functions as a heat transfer surface, and an insulated particle separator together has presented a serious problem due to their different behavior in thermal expansion. It is obvious that a massive particle separator containing ceramic parts of approximately 300 mm in thickness must be supported at the bottom and must be provided with a self-supporting steel casing. The reactor chamber with panel structures is preferably supported from above and therefore thermal expansion takes place mainly downwards. In operation, temperature of the reactor chamber in a conventional circulation reactors is typically about 300° C. whereas the supporting steel casing of a particle separator must be maintained at 80° C. maximum, at the highest, for safety reasons and for minimizing heat losses. Therefore, it is clear that conventional circulation reactors suffer from severe movements due to temperature changes during starting up and running down. This invention removes the aforementioned problems since the combustion unit behaves as a single unit under the temperature changes during starting up and running down.

Taken as a whole, an advantageous constructional solution is obtained when the flue gas inlet is placed in the first, outer casing to extend for the entire circumference of the casing. The particle separator and the inlet ductwork traditionally associated therewith require a large space. Therefore, a conventional cyclone separators cannot be placed inside the reactor chamber without expensive, inconvenient and unpractical constructions. The problem then is how to accomplish, considering its construction and its flow properties, such an inlet ductwork for the flue gases that would provide a sufficient guiding action for the flue gases and where the space requirement of the inlet ductwork would be only a fraction compared to the space requirement of the inlet ductwork in conventional cyclone separators. The above problem can be solved by placing the flue gas inlet in the first, outer casing to extend for the entire circumference of the casing. This brings along one particular advantage in that, when a tubular heat transfer surface is used in the first, outer casing, the tubes themselves, or in some cases bending of the tubes, can provide the supporting structure for the flue gas inlet so that baffle blades made of a ceramic material can be formed on this supporting structure for the flue gas flow.

According to one particularly advantageous embodiment, the horizontal cross-section of the reactor chamber, at least at the point where the particle separator is located, is circular, whereupon the center line of the cross-sectional form coincides with the common center line of the casings of the separator. This solution brings about an ideal structure, which is axially symmetric at least at the point where the particle separator is located. Several advantages are obtained as to the combustion, flow and constructional properties compared to conventional circulation reactors having a rectangular cross-section. Due to constructional reasons, massive supporting structures are required for reinforcing the walls in conventional rectangular reactor parts, especially in large combustion units. Taking into account the thermal expansion further increases the complexity of these supporting structures. In pressurized applications, this disadvantage becomes worse since a separate pressure exterior must be used into which the reactor chamber must be placed. Most of the aforementioned drawbacks are removed by the axially symmetric structure of the present invention as described above.

Some advantageous embodiments of the combustion unit according to the invention are presented in the enclosed subclaims.

BRIEF DESCRIPTION OF THE DRAWINGS

The invention will now be further illustrated by referring to the enclosed drawings. In the drawings.

DETAILED DESCRIPTION OF THE PREFERRED EMBODIMENTS

Figure 1:
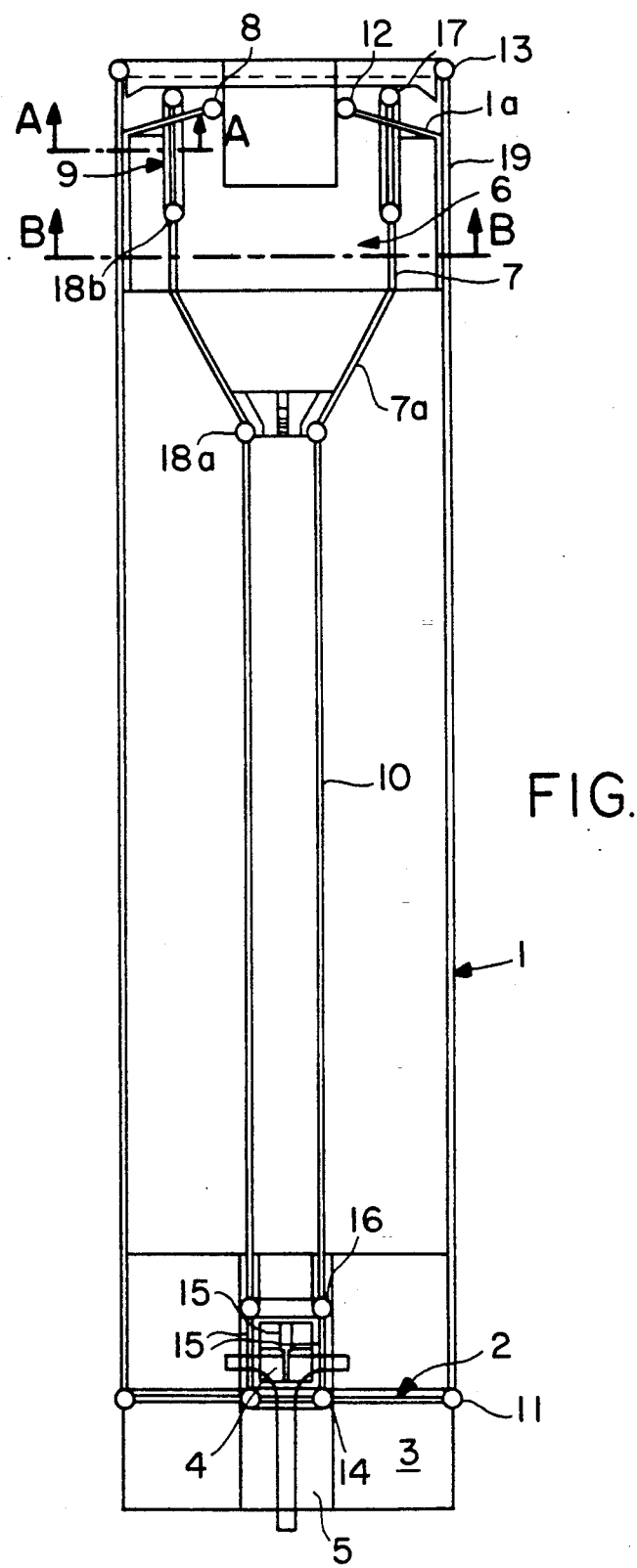
FIG. 1 shows a vertical cross-sectional view of the combustion unit according to the invention taken along the center line.

The main parts of the unit can be seen especially in FIG. 1. A cylindrical reactor chamber 1 with a circular cross-section is placed in a vertical position. The wall structure constituting the casing of the reactor chamber is essentially formed into a heat transfer surface comprising a plurality of tubes and extending at least along the vertical part of the wall structure. The heat transfer medium is arranged to flow inside the tubular structure. In the lower part of the reactor chamber 1 there is a grate structure 2 provided with a combustion air supply by using, for example, a conventional nozzle system (not shown). For this purpose, there is provided a so-called air cabinet 3 through which the combustion air is conducted to the nozzle system. Furthermore, in connection the grate there is provided with a fuel supply device 4 and an outlet 5 for the coarse material.

On top of the grate structure 2 the fluidized bed is formed and the flue gases generated therein flow upwards carrying away solid material.

Inside the upper part of the reactor chamber 1, there is a particle separator 6 having a first outer casing 7 and a second inner casing 8 which both have a circular horizontal cross-section and whose center lines are arranged essentially to coincide and preferably to coincide with the center line of the reactor chamber 1. The first, casing 7 is provided with a flue gas inlet. The lower part of the first i.e. the outer casing 7, is provided with a tapered portion 7a which is symmetric with respect to the center line, and the vertical return duct 10, having preferably a circular cross-section and its center line coinciding with that of the reactor chamber 1, is connected to the lower part of the first, outer casing. The return duct 10 extends in the vertical direction from the lower part of the first, outer casing to the lower part of the reactor chamber 1 to the fluidized bed zone.

The second, inner casing 8 of the particle separator is, in the vertical direction, essentially shorter than the first, outer casing 7 and it has an essentially tubular form and its upper part is connected to the process stage subsequent to the combustion unit for transferring the flue gases free of solid material through the second, inner casing 8 to the process stage subsequent to the combustion unit.

At least the first, outer casing 7 is arranged to form preferably a tubular heat transfer surface through which the heat transfer medium is arranged to flow. It is obvious that also the second, inner casing 8 can be arranged to form a heat transfer surface by forming it into a heat transfer surface composed of parallel tubes.

As seen particularly in FIG. 1, the tubular structure forming the wall of the reactor chamber 1, containing the heat transfer medium, is arranged to form the roof structure 1a of the combustion unit and then at least some of the tubes leaving the annular distributor pipe 11 in the lower part of the reactor chamber end in an annular collector pipe 12 which surrounds the second, inner casing 8 of the particle separator which casing is attached to the annular collector pipe 12. Part of the tubes leaving the annular distributor pipe 11 can be connected in the upper part of the reactor chamber, as shown in FIG. 1, to a second annular collector pipe 13 in the upper part of the reactor chamber. Further referring to FIG. 1, the annular distributor pipe 11 supplies water, which functions as the heat transfer medium, via the tubular grate structure 2 to the annular distributor pipe 14, which is located below the return duct 10, whereupon the vertical tubes 15 provide connection from the distributor pipe 14 to the second annular distributor tube 16 which is located in the lower part of the return duct 10, and the return duct as a whole is arranged to form a heat transfer surface comprising vertical tubes. Flow of the heat transfer medium takes place through the return duct 10 to the lower part of the first outer casing and from there further through the tubular structure of the casing 7, through intermediate collector chambers 18a, 18b to the annular collector tube 17. From the foregoing it will be evident that flow of the heat transfer medium can be simply arranged so that essentially the whole combustion unit functions as a heat transfer surface.

Figure 2:
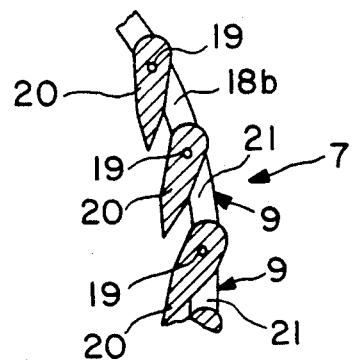
FIGS. 2 and 3 show partial cross-sectional views of FIG. 1 taken along A—A at the point where the flue gas inlet is located for illustrating two embodiments.

An alternative structure for the first, outer casing 7 is presented especially in FIG. 1, where there is another annular intermediate collector chamber 18b arranged close to the lower part of the flue gas inlet 9, wherefrom the spaced tubular structure extends upwards to the collector pipe 17. In this way, a construction shown especially in FIG. 2 is obtained wherein the flue gas inlet 9 is composed of several openings placed at specific intervals in the circumference of the first, outer casing 7, wherein the openings are of equal size and preferably rectangular and placed at the same height level. The flue gas inlet 9 is placed in the upper part of the reactor chamber immediately below the roof structure 1a of the reactor chamber 1 where the roof structure 1a functions as a blocking surface for the vertical flow of the flue gases. Depending on the size of the combustion unit, the number of openings placed in the flue gas inlet 9 can vary between 5-30. Each element 19, which is composed of one or more tubes and which leaves the intermediate collector chamber 18b and which elements are arranged in a spaced manner compared to the arrangement within corresponding part of the first, outer casing below the intermediate collector chamber 18b, is placed inside a blade 20 preferably made of a ceramic material. Elements 19 are provided with suitable gripping elements, such as gripping bars for effecting gripping between the ceramic material and the elements 19. The plurality of blades composed of said blades 20 is placed in an oblique position with respect to the circumference of the first, outer casing 7 so that flue gases flow mainly tangentially into the inside of the first, outer casing 7 through the flue gas inlet openings 21. As seen particularly in FIG. 2, the blades 20 are placed essentially inside the outer surface of the first, outer casing 7.

Figure 3:
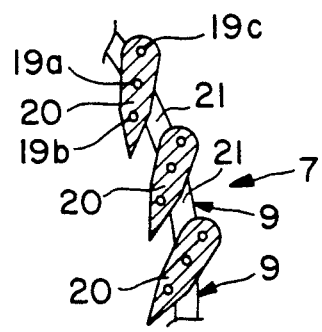

FIG. 3 shows another structural alternative according to the present invention for the flue gas inlet where there are no intermediate collector chamber 18b as in FIGS. 1 and 2 but the tubes of the first, outer casing 7 continue uniformly from the first collector chamber 18a up to the collector pipe 17 above the roof structure 1a. In this case, the ceramic blades 20 accommodate those parts of the tubular heat transfer surface of the first, outer casing 7 which are located by the flue gas inlet 9. These parts are each bent from the surface plane of the casing so that they are located within the horizontal cross-sectional area of the blade in question and the parts are provided with gripping elements to effect gripping between the parts and the ceramic material. In the embodiment shown in FIG. 3, the cross-section of each blade 20 contains three tubes the middle one which 19a is located in the plane of the first, outer casing 7; the first one 19b of the tubes on its side is bent inwards relative to the casing 7 and the second one 19c outwards relative to the casing 7. Thus, a plurality of blades is formed which is partly located outside the casing 7, for example, that part which is located within the flue gas inlet edge region of the blades. It is obvious that bending of the tubes can be performed so that a structure according to FIG. 2 is obtained with the plurality of blades located completely inside the surface of the casing 7. In this case, all the tubes that must be bent are bent, inwards inside of the casing 7.

Figure 4:
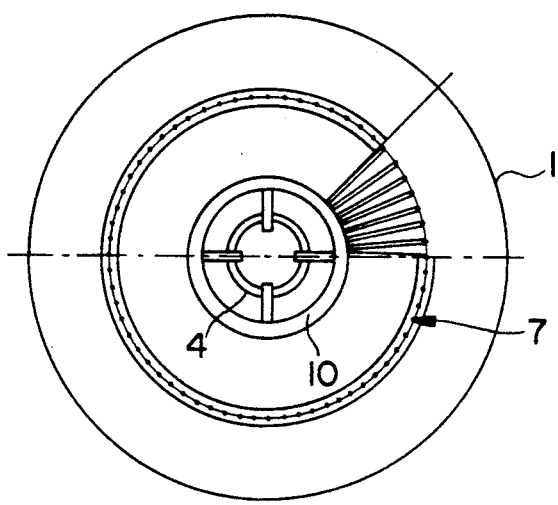
FIG. 4 shows the cross-section along B—B in FIG. 1.

FIG. 4 shows the cross-section along B—B in FIG. 1 for illustrating the structure especially in the embodiment shown in FIG. 2.

We claim:

1. A combustion unit for a circulation process comprising:

a reactor chamber placed substantially in a vertical position, having at least its vertical wall structure arranged to form a substantially tubular heat transfer surface, with a flow of a heat transfer medium being arranged inside the tubular structure and an exothermic combustion reaction, a so-called fluidized bed, being arranged to take place by means of fuel and air supplied in the lower part of the reactor chamber wherein the flue gases generated in the reaction and containing solid material flow upwards in the reactor chamber and at least one particle separator, a cyclone separator, placed inside the reactor chamber in the upper part thereof, the separator having two casings one placed substantially inside the other, their center axes being arranged substantially coincident and in a vertical position, a first outer casing being provided with a flue gas inlet and the lower part of said first, outer casing being provided with a return duct for returning the solid material separated from the flue gases to the lower part of the reactor chamber and the upper part of a second inner tubular casing with open ends being connected at its upper end to the subsequent process stage for carrying the flue gases essentially free from solid material through said second inner casing to said process stage subsequent to the combustion unit;

wherein at least said first, outer casing of said particle separator is arranged to form substantially a tubular heat transfer surface, with a flow of the heat transfer medium being arranged inside the tubular structure, and wherein the flue gas inlet into said first, outer casing is arranged to extend for the entire circumference of the casing.

2. A combustion unit according to claim 2, wherein the cross-section of the reactor chamber, at least at the point where the particle separator is located, is circular and wherein its center line is arranged to coincide with the common center line of the first and second casing of the particle separator.

3. A combustion unit according to claim 1, wherein the flue gas inlet consists of several openings placed at specific intervals in the circumference of said first, outer casing.

4. A combustion unit according to claim 3, wherein the openings of the flue gas inlet are substantially of the same size and placed at the same height level.

5. A combustion unit according to claim 1, wherein there are 5-30 openings arranged in the circumference of said first, outer casing.

6. A combustion unit according to claim 1, wherein, next to the vertical edges of the openings, there is a blade each formed between two adjacent openings for directing the flue gas flow primarily tangentially into said first, outer casing.

7. A combustion unit according to claim 6, wherein plurality of blades are substantially placed inside said first, outer casing.

8. A combustion unit according to claim 6, wherein each blade is substantially composed of form pieces made from a ceramic material and wherein at least one tube, which belongs to the heat transfer surface of said first, outer casing, is placed inside each blade.

9. A combustion unit according to claim 8, wherein the tubular structure of said first outer casing is spaced at the point where the flue gas inlet is located.

10. A combustion unit according to claim 8, wherein part of the tubes of the tubular structure of first, outer casing are bent at the flue gas inlet so that they are situated inside the cross-section of the form piece forming the blade.

11. A combustion unit according to claim 1, wherein the flue gas inlet is placed in the upper part of the reactor chamber so that it extends downward starting substantially immediately from the surface of the reactor chamber which blocks the vertical flow of the flue gases.

12. A combustion unit according to claim 1, wherein the supply of the heat transfer medium of said first outer casing is arranged to take place through the return duct and the return duct is also adapted to function as a heat transfer surface, into which the heat transfer medium is supplied through the grate structure.

13. A combustion unit according to claim 2, wherein there are 5–30 openings arranged in the circumference of said first, outer casing.

14. A combustion unit according to claim 3, wherein there are 5–30 openings arranged in the circumference of said first, outer casing.

15. A combustion unit according to claim 2, wherein, next to the vertical edges of the openings, there is a blade each formed between two adjacent openings for directing the flue gas flow primarily tangentially into said first, outer casing.

* * * * *